March 29, 1932.    M. GENSECKE    1,851,093
METHOD FOR DISTILLING MINERAL OILS
Filed July 12, 1928
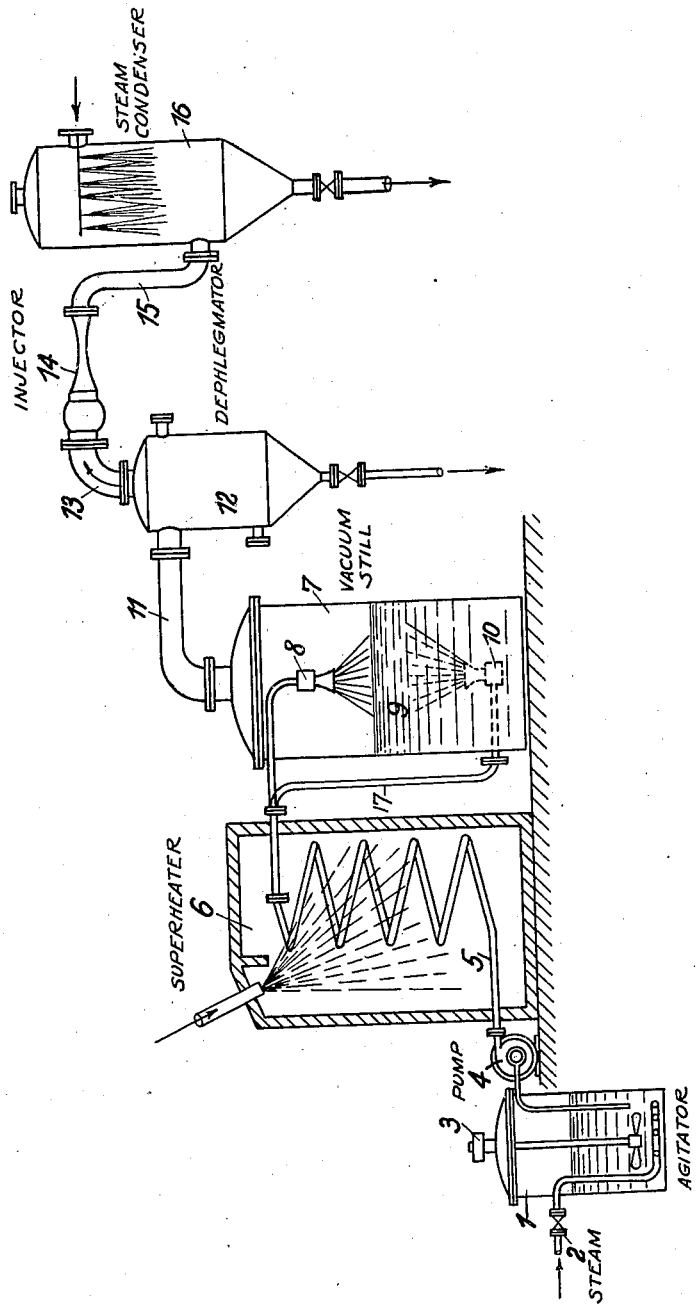
Inventor:
Maximilian Gensecke,
By Byrnes Townsend & Brickenstein,
Attorneys.

Patented Mar. 29, 1932

1,851,093

UNITED STATES PATENT OFFICE

MAXIMILIAN GENSECKE, OF FRANKFORT-ON-THE-MAIN, GERMANY

METHOD FOR DISTILLING MINERAL OILS

Application filed July 12, 1928, Serial No. 292,071, and in Germany August 3, 1927.

This invention relates to a method for distilling mineral oils.

Some of the known methods for the distillation of mineral oils employ a super-vacuum in order to lower the boiling temperature of the different fractions, thus protecting the oils. It is also known to blow steam into the oil during the distillation in order to further decrease the partial pressure of the vapors.

It has now been found that by suitable action of water or steam upon the oil to be distilled an effective loosening of the cohesion of the oil molecules, facilitating the distillation, may be obtained, thereby producing a colloidal or molecular motion in the oil. When working according to the new method, first an intimate mixture of oil and water is formed. This mixture is heated up to the temperature necessary for distillation and brought, before or after its formation, under such a high pressure that at first no water will be evaporated. The mixture is then brought into a still, working for example at a super-vacuum. In that moment the emulsion is suddenly released from tension, and evaporation of the water takes place. The great increase in volume which takes place by the sudden transition of the water from the liquid into the gaseous phase has the effect that the oil surrounding the drops of water is intensively expanded and divided into small particles. One may say that in this moment a great number of small explosions takes place in the oil, which naturally have a far greater atomizing and distributing action than may be obtained by passing steam or water into the oil according to the known methods. By the new method the oil surface obtained is much greater than in the known methods. But also in the single oil drops a molecular motion is produced, so that the single oil molecules may come more often to the surface of the oil drops, where the distillation takes place. Thus the time necessary for distillation according to the new method is to a great extent decreased.

The still may be filled more or less with oil and the oil water mixture may be introduced into the still above or below the oil level. In order to be able to utilize for the distillation process the potential energy of the oil water mixture, standing under a high pressure for example 220 atm., the release in tension is preferably carried through in nozzles in which the potential energy is converted in kinetic energy. The oil then passes the nozzles with a great velocity, thus improving the distribution of the oil drops and thereby also the distillation. As the oil has often to be heated up to temperatures of about 400° C. and above, it is preferable to add the water to the oil before preheating it, in order to obtain a favourable distribution of the water drops in the oil. A pump is then used to bring the oil-water mixture under such a pressure that no steam bubbles are formed during the heating of the oil. The formation of steam bubbles moreover first takes place, when the emulsion enters the still.

The annexed drawing shows a device for carrying out the new method by way of example.

1 is an agitator in which the mixture of oil and water is produced by addition of water to the oil. 3 is the stirrer in the agitator. The mixture may also be produced in another way for example by using steam, which is blown into the oil and condensed there, said steam entering the vessel 1 at 2. A pump 4 sets the mixture under the desired pressure. The coil 5 arranged in a super heater 6 heats the mixture up to a temperature which is slightly above the distillation temperature corresponding to the vacuum in the still 7. The mixture of oil and water is blown by a nozzle 8 into the still 7. The water is then evaporated, thus providing a great distillation surface and a vigorous motion of the oil content 9 in the vessel 7. The oil-water mixture may also enter the still 7 below the level of the oil content 9, through pipe 17 and nozzle 10. The produced steam together with the oil vapor leaves the still by the tube 11 and enters a dephlegmator 12, where the oil vapors are condensed, the steam passing through the tube 13 to a device 14 for example an injector for increasing the vacuum. The device 14 compresses the steam, which is then conducted into the condenser 16, where it is condensed. It is however not necessary to work under a super vacuum. One may also produce and introduce the water-oil mixture into the still 7 in a different manner.

The main purpose of the new method is the heating under presure of the oil-water mixture up to a temperature slightly above distillation temperature, thus obtaining after the release of pressure a fine distribution of the oil in the still. Instead of water one may also use other liquids forming emulsions or intimate mixtures with oils.

I claim:

1. A method of distilling mineral oils which comprises preparing an intimate mixture consisting of mineral oil and water, heating said mixture to about the distillation temperature of the oil under a high pressure such that the water content thereof can not vaporize, and suddenly releasing the pressure at that temperature sufficiently to cause immediate explosive vaporization of the water, whereby the mineral oil is caused to become extremely finely divided.

2. A method of distilling mineral oils which comprises preparing an intimate mixture consisting of mineral oil and water, heating said mixture to about the distillation temperature of the oil under a high pressure such that the water content thereof can not vaporize, and injecting the heated mixture into a vacuum still containing a quantity of the oil to be distilled so as to cause explosive vaporization of the water contained in the mixture.

In testimony whereof I affix my signature.

MAXIMILIAN GENSECKE.